United States Patent [19]

Szalvay

[11] 4,310,183
[45] Jan. 12, 1982

[54] COMPOSITE PIPE COUPLING

[75] Inventor: Laszlo Szalvay, San Carlos, Calif.

[73] Assignee: Raychem Corporation, Menlo Park, Calif.

[21] Appl. No.: 97,779

[22] Filed: Nov. 28, 1979

[51] Int. Cl.³ ............................................. F16Z 35/00
[52] U.S. Cl. ...................................... 285/114; 285/55; 285/373; 285/381
[58] Field of Search ................. 285/381, 55, 114, 373, 285/45, 301; 29/447

[56] References Cited

U.S. PATENT DOCUMENTS

| 418,752 | 1/1890 | Rogers | 285/381 |
|---|---|---|---|
| 2,984,894 | 5/1961 | Richter et al. | 285/381 X |
| 3,360,846 | 1/1968 | Schellstede et al. | 29/447 |
| 3,408,725 | 11/1968 | Grayson | 29/447 |
| 3,531,146 | 9/1970 | Blad et al. | 285/381 X |
| 3,730,562 | 5/1973 | Viazzi | 285/381 X |
| 3,827,727 | 8/1974 | Moebius | 285/417 |
| 3,836,182 | 9/1974 | Miller | 285/369 X |
| 3,872,573 | 3/1975 | Nichols | 285/381 X |
| 4,070,044 | 1/1978 | Carrow | 285/381 X |
| 4,124,231 | 11/1978 | Ahlstone | 285/381 X |
| 4,135,743 | 1/1979 | Hughes | 285/381 |

FOREIGN PATENT DOCUMENTS

| 2448160 | 5/1975 | Fed. Rep. of Germany | 285/381 |
|---|---|---|---|
| 2306784 | 11/1976 | France | . |
| 1232741 | 5/1971 | United Kingdom | 285/381 |
| 1518788 | 7/1978 | United Kingdom | 285/381 |

Primary Examiner—Dave W. Arola
Attorney, Agent, or Firm—James W. Peterson

[57] ABSTRACT

The invention is a composite pipe coupling having a corrosion resistant liner which seals pipes to be coupled by the utilization of heat recoverable metallic material and having a complementary external support structure which allows high tensile loading of the coupling.

6 Claims, 3 Drawing Figures

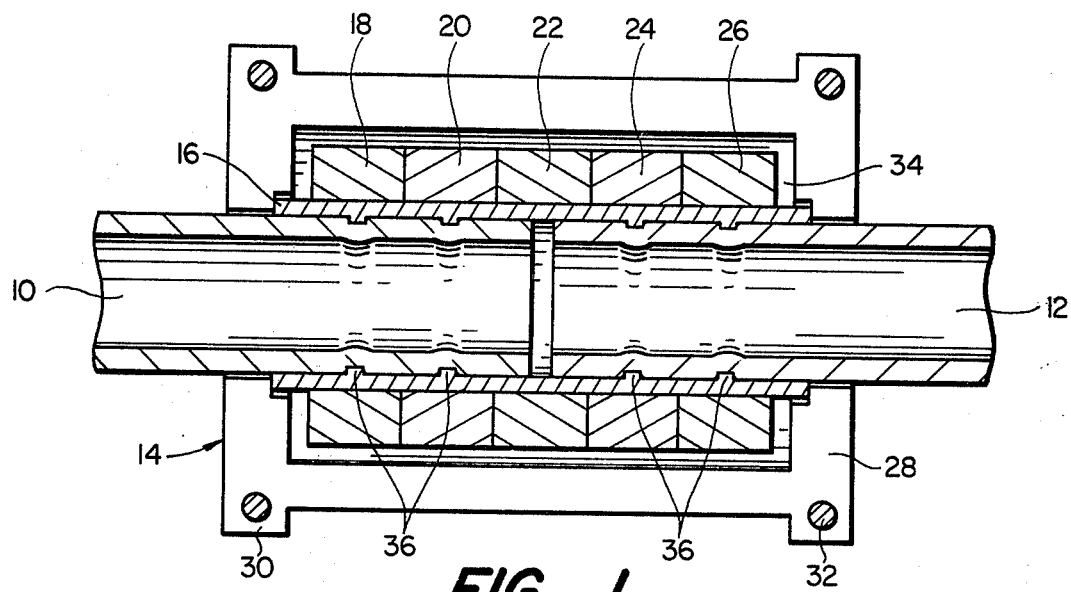
FIG__1
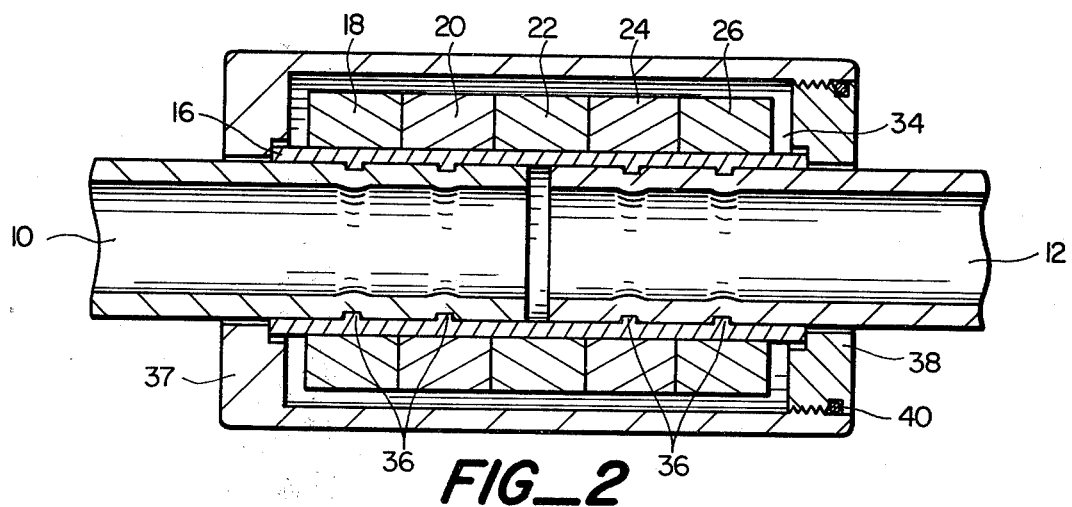
FIG__2
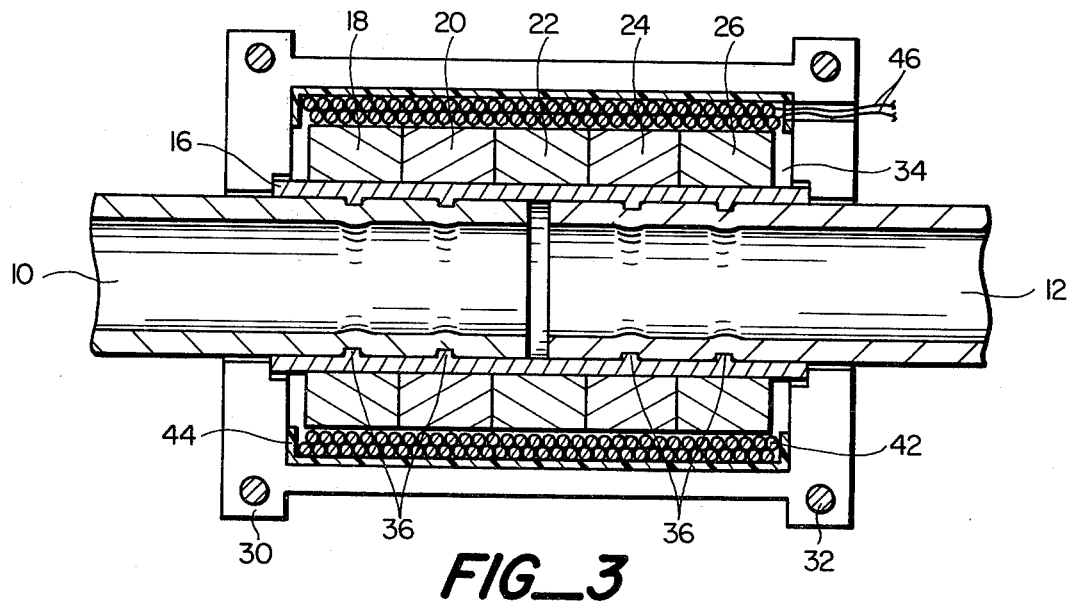
FIG__3

COMPOSITE PIPE COUPLING

BACKGROUND OF THE INVENTION

In the past, heat-recoverable metal couplings have been developed for joining pipes together for such applications as aircraft hydraulic systems. See for example U.S. Pat. No. 4,135,743, issued Jan. 23, 1979 which is assigned to the assignee of the present invention. As discussed in said patent, couplings have been made entirely out of heat recoverable metal and are referred to generally as monolithic couplings. Composite couplings have been made using a liner which is driven by heat-recoverable metal to effect sealing. When such a composite pipe coupling having a liner is utilized, the tensile strength characteristics of the coupling itself depend primarily upon the thickness or cross-sectional area of the liner as well as other factors. It can be understood, therefore, that an increase in tensile load strength requires an increase in thickness of the liner and correspondingly a greater driving force to crush the liner to seal with respect to the pipes being coupled. It must be understood that even if the heat-recoverable metal driver portion is unitary it will carry only a nominal amount of tensile load since it is only in frictional contact with the liner. The major portion of said tensile load is carried by the liner. If the driver portion is not unitary, i.e., if it is a plurality of ring segments it would obviously be incapable of carrying any tensile load. Such prior art devices are therefore limited in tensile strength and utility.

The subject composite pipe coupling has been designed for all diameter pipe and especially for large diameter pipe utilized in undersea gas and oil transport. The subject coupling must be capable of withstanding high hydraulic or pneumatic pressure internally and high stresses created by movement of undersea piping by the sea itself during operation.

The subject invention provides a composite pipe coupling having a corrosion resistant liner wherein the tensile strength of the composite coupling is not limited by the tensile strength of the lining.

SUMMARY OF THE INVENTION

It is the purpose of instant invention to provide a high pressure pipe coupling that is corrosion resistant and has superior strength characteristics. To accomplish this purpose, the instant invention provides a device utilizing a liner driven by sections of heat recoverable metal and having external support structure to accomodate high tensile loading of the coupling.

OBJECTS OF THE INVENTION

It is a primary object of the instant invention to provide a high strength coupling utilizing heat-recoverable metal.

It is yet another object of the instant invention to provide a composite pipe coupling having superior pipe wall penetration and capable of superior tensile loading.

It is also an object of the instant invention to provide a composite pipe coupling having superior corrosion resistance.

It is a further object of the instant invention to provide a composite pipe coupling that is capable of thermally controlled pipe sealing.

It is still another object of the instant invention to provide a thermally activated, high tensile loading coupling for subsea installation requiring no subsea welding and not employing flanges which are leak prone.

Other and further object and advantages will become obvious hereinafter.

DESCRIPTION OF THE DRAWING

FIG. 1 is a cross-sectional view of the composite pipe coupling of the instant invention.

FIG. 2 is a cross-sectional view of an alternate embodiment of the instant invention utilizing an optional support structure.

FIG. 3 is a cross-sectional view of another alternate embodiment of the instant invention utilizing supplemental heaters.

DESCRIPTION OF THE PREFERRED EMBODIMENT

With reference to the drawing, FIG. 1 illustrates a cross-section of a composite pipe coupling connecting pipes 10 and 12. In operation, the pipes 10 and 12 are positioned within the composite pipe coupling shown generally at 14 through over-sized hollow, tube like liner means 16. Liner means 16 is thin in cross-section and is preferably made from a material that is resistant to corrosive fluids or gases that are being pumped through pipes 10 and 12, and to external pipe corrosive atmosphere. Driver means 18, 20, 22, 24 and 26 are positioned concentrically around liner means 16. Said driver means are made from a heat-recoverable metal. In the preferred embodiment, a plurality of driver means in the form of rings are utilized, but it is understood that a one-piece or unitary driver may be utilized. In the preferred embodiment, driver means 22 has less recovery than driver means 18, 20, 24 and 26 because it is not desirable to subject the ends of pipes 10 and 12 to the great compressive forces which might tend to deform and bend into the pipes and therefore constrict flow within the pipes or weaken the connection. It is understood that the degree of recovery of memory type metals is controllable and depends upon the amount of deformation it is subjected to in its martensitic state. It is also understood that any number of rings may be used. It is important to note that segmenting the driver means has several advantages. One such advantage is the ease of manufacture as for example by ring rolling of individual segments such as driver means 18, 20, 22, 24 and 26, which would not be possible if the driver means were unitary. Ring rolling the individual segments improves the mechanical properties and performance of each segment. Ring rolling will develop an orientation or texture in a preferred manner with respect to the direction of maximum strain. Since this direction is the same (tangential) as the hoop stresses developed in the rings during their expansion and recovery the ring rolling process will improve the mechanical properties of the rings.

It is also more economical to control the driver thickness along its length by segmenting rather than by machining a one piece driver. One of the most important advantages of the segmented design is that the final coupling is inherently more reliable. Specifically, if any segment should fail the coupling will generally remain operable.

Driver means 18, 20, 22, 24 and 26 are made from heat-recoverable metals which are commonly called memory alloys. These ring-like members, have been deformed from an original configuration and retain their deformed configuration until they are heated, at which time they will recover toward their original configuration. These alloys exhibit a so-called martensitic transformation from a low temperature form to high temperature form and it is this transformation which produces the memory effect. Among such alloys there may be mentioned for example, various alloys of titanium and nickel which are described in U.S. Pat. Nos. 3,174,851, 3,351,463, 3,753,700, 3,759,552, British Pat. Nos. 1,327,441, and 1,327,442 and NASA Publication SP 110, "55-Nitinol-The Alloy with a Memory, etc." (U.S. Government Printing Office, Washington, D.C. 1972). The property of heat-recoverability is not confined to such titanium nickel alloys. Thus, for example, various beta-brass alloys have been demonstrated to exhibit this property in for example, N. Nakanishi et al., Scipta Metallurgica 5, 433–440 (Pergamon Press, 1971) and such materials may be alloyed to lower their transition temperatures to cryogenic regimes by known techniques. Similarly, type 304 stainless steels have been shown to enjoy such characteristics (see E. Enami et al., at pages 663–668).

As shown in FIG. 1, the driver means has been heated and has constricted radially inwardly and has gripped the liner means to cause the liner means to seal with respect to the pipes. In the instant invention, the tensile load capability of the liner is greatly increased by use of external support means 28, which comprises two half-shells (only one is shown) that are coupled together by flange members 30 and bolts 32. The external support means 28 contacts the ends of the liner means 16 at the periphery of the opening through said liner means 16. The liner means 16 is contained radially by the driver means 18, 20, 22, 24 and 26 and axially by the external support means 28. Tensile loads on liner means 16 created by pipes 10 and 12 are transmitted by the radially contained liner means 16 axially through its ends to the external support means, said liner means 16 therefore acting as a compression member. Of the total tensile load of the coupling, a much greater portion is carried by the external support means 28 than by the liner means 16. The ratio of the tensile load carried between the external support means 28 and the liner means 16 depends upon the modules of elasticity, yield strength and cross section area of the respective members. It is understood that the external support means 28 may be any number of segments. There is preferably a slight force fit between the external support means 28 and the liner means 16 to insure that the liner means 16 will not elongate under tensile load without the external support means also elongating. Note also that there is a small amount of axial space 34 between the outer ends of driver means and the inside of the external support means 28 to accommodate some axial swelling of the driver means when it returns to original shape and drives the liner means 16 into engaging contact with pipes 10 and 12. It is, however, within the scope of the invention possible to vary the amount of spacing between the external support means 28 and the driver means generally to place some load on the external support means, if desired.

It can be seen in FIG. 1 that the inside surface of the liner means 16 has continuous ring-like teeth 36 which cut into the pipes 10 and 12. In the embodiment shown in FIG. 1 the liner means 16 has teeth of generally square cross section positioned on the inside of liner means 16 at points generally axially centered under driver means 18, 20, 24 and 26. Variations of the configuration, size and number of such teeth or serrations are within the scope of the invention.

It can also be seen that liner means 16 and driver means 18, 20, 22, 24 and 26 have a close fit. The relative dimensions of these members must be such that the driver means can slide over the liner means 16 during assembly but yet not be so loose in tolerance as to defeat the desired constricting and gripping forces generated by the driver means when it returns to its original shape.

FIG. 2 illustrates an alternate construction of the external support means. In this embodiment the external support means is a canister 37 and complementary lid 38. The canister 37 has a generally cylindrical side wall and an end wall having an opening therethrough to accommodate one of the pipes to be coupled. Likewise the lid 38 has an opening therethrough to accommodate the other pipe to be coupled. The lid 38 is attached to the canister by conventional means, as for example by threading. Other fastening means such as flanges and bolts, welding, adhesives, etc., would be within the scope of the invention. It is also within the scope of the invention to vary the configuration of the canister from cylindrical to cubical, spherical, etc. as may be desired. It is important to note that lid 38 and canister 37 interface may be sealed by an "O" ring 40 as shown to keep out external contamination such as sea water.

FIG. 3 illustrates an alternate embodiment of the instant invention wherein the device shown in FIG. 1 is supplemented with a controllable heating device. A heater may be desired when a memory metal element with austenitic start temperature above ambient is utilized. An electrical heating element 42 is placed in the cavity between the external support means and the driver means. Some insulation 44 is placed between the heating element 52 and the external support means to increase the efficiency of the heating element. Power leads 46 connect the heating element 42 to a power source (not shown) to energize the heating element as desired. In the case where the transformation temperature is below the ambient temperature the heater will accelerate the transformation. It is within the scope of the invention to utilize other heating means in the cavity between the external support means and the driver means, i.e. chemical reaction heating devices, etc. or to provide an externally heated medium which is pumped through the coupling cavity.

From the foregoing detailed description, it is evident that there are a number of changes, adaptations and modifications of the present invention which come within the province of those skilled in the art. However, it is intended that all such variations not departing from the spirit of the invention be considered as within the scope thereof as limited solely by the appended claims.

What is claimed is:

1. A composite pipe coupling comprising:
   (a) a liner means having an opening therethrough capable of receiving the ends of the pipes to be connected;
   (b) driver means of heat-recoverable metallic material having an opening therethrough mounted concentrically around said liner means, said driver means constricting radially inwardly upon heat recovery to grip and radially contain said liner means into a sealing condition with pipes to be connected; and
   (c) external support means having an opening therethrough mounted concentrically around said driver means and contacting each end of said liner means at the periphery of the opening through said liner means to axially support and contain said liner means, said liner means acting as a compression member to transmit tensile loading created by the pipes to be connected through the radially and axially contained liner means to said external support means.

2. A device as in claim 1 wherein said driver means comprises a plurality of ring-like segments distributed axially along and over said liner means.

3. A device as in claim 1 wherein said external support housing comprises a cylindrical canister having an axial opening through the ends of said cylinder wherein one end of said canister is detachable from the remainder of the canister for purpose of assembly.

4. A device as in claim 1 wherein the driver means has a varying degree of heat recovery whereby the gripping forces of said driver means are thereby variable.

5. A device as in claim 2 wherein said external support housing comprises a cylindrical canister having an axial opening through the ends of said cylinder wherein one end of said canister is detachable from the remainder of the canister for purpose of assembly.

6. A device as in claim 5 wherein the driver means has a varying degree of heat recovery whereby the gripping forces of said driver means are thereby variable.

* * * * *

UNITED STATES PATENT AND TRADEMARK OFFICE
CERTIFICATE OF CORRECTION

PATENT NO. : 4,310,183
DATED : January 12, 1982
INVENTOR(S) : Laszlo Szalvay

It is certified that error appears in the above-identified patent and that said Letters Patent are hereby corrected as shown below:

column 4, line 35, "52" should read -- 42 --.

Signed and Sealed this

Sixth Day of April 1982

|SEAL|

Attest:

Attesting Officer

GERALD J. MOSSINGHOFF
Commissioner of Patents and Trademarks